US012184947B2

(12) United States Patent
Shoss et al.

(10) Patent No.: US 12,184,947 B2
(45) Date of Patent: Dec. 31, 2024

(54) MANIPULATING VIDEO LIVESTREAM BACKGROUND IMAGES

(71) Applicant: Loop Now Technologies, Inc., San Mateo, CA (US)

(72) Inventors: Michael A Shoss, Milton (CA); Edwin Chiu, Cupertino, CA (US); Wu-Hsi Li, Somerville, MA (US); Jerry Ting Kwan Luk, Menlo Park, CA (US); Ziming Zhuang, Palo Alto, CA (US)

(73) Assignee: Loop Now Technologies, Inc., San Mateo, CA (US)

( * ) Notice: Subject to any disclaimer, the term of this patent is extended or adjusted under 35 U.S.C. 154(b) by 0 days.

(21) Appl. No.: 18/207,717

(22) Filed: Jun. 9, 2023

(65) Prior Publication Data

US 2023/0403440 A1 Dec. 14, 2023

Related U.S. Application Data

(60) Provisional application No. 63/464,207, filed on May 5, 2023, provisional application No. 63/458,733, filed on Apr. 12, 2023, provisional application No. 63/458,458, filed on Apr. 11, 2023, provisional application No. 63/458,178, filed on Apr. 10, 2023, (Continued)

(51) Int. Cl.
*H04N 21/234* (2011.01)
*H04N 21/2187* (2011.01)
*H04N 21/81* (2011.01)
*G06Q 30/0273* (2023.01)

(52) U.S. Cl.
CPC ....... *H04N 21/812* (2013.01); *H04N 21/2187* (2013.01); *H04N 21/23418* (2013.01); *H04N 21/8133* (2013.01); *H04N 21/8153* (2013.01); *G06Q 30/0275* (2013.01)

(58) Field of Classification Search
CPC .............................................. H04N 21/23418
See application file for complete search history.

(56) References Cited

U.S. PATENT DOCUMENTS 8,069,414 B2  11/2011  Hartwig et al.
8,244,707 B2   8/2012  Lin et al.
(Continued)

FOREIGN PATENT DOCUMENTS

KR     101606860 B1     3/2016

*Primary Examiner* — Michael H Hong
(74) *Attorney, Agent, or Firm* — Adams Intellex, PLC

(57) ABSTRACT

Techniques for manipulating video livestream background images are disclosed. A short-form video, such as a livestream video or livestream replay video, can be analyzed for context. Computer-implemented techniques may be used for performing entity detection, and can also detect a change in subject based on speech and/or actions of a host individual. The subject can include a particular product. The detecting a change in subject can include detecting a foreground object and identifying the foreground object as a product. The identification of the foreground object as a product can include performing optical character recognition on text imprinted on a foreground object. The identification of the foreground object as a product can include image recognition techniques. The identification of the foreground object as a product can include scanning of an optical code such as a barcode that is imprinted on the product.

21 Claims, 9 Drawing Sheets

Related U.S. Application Data provisional application No. 63/454,976, filed on Mar. 28, 2023, provisional application No. 63/447,918, filed on Feb. 24, 2023, provisional application No. 63/447,925, filed on Feb. 24, 2023, provisional application No. 63/443,063, filed on Feb. 3, 2023, provisional application No. 63/438,011, filed on Jan. 10, 2023, provisional application No. 63/437,397, filed on Jan. 6, 2023, provisional application No. 63/431,757, filed on Dec. 12, 2022, provisional application No. 63/430,372, filed on Dec. 6, 2022, provisional application No. 63/424,958, filed on Nov. 14, 2022, provisional application No. 63/423,128, filed on Nov. 7, 2022, provisional application No. 63/414,604, filed on Oct. 10, 2022, provisional application No. 63/413,272, filed on Oct. 5, 2022, provisional application No. 63/395,370, filed on Aug. 5, 2022, provisional application No. 63/388,270, filed on Jul. 12, 2022, provisional application No. 63/351,840, filed on Jun. 14, 2022, provisional application No. 63/350,894, filed on Jun. 10, 2022.

(56) References Cited

U.S. PATENT DOCUMENTS

| | | |
|---|---|---|
| 8,572,490 B2 | 10/2013 | Hartwig et al. |
| 9,118,712 B2 | 8/2015 | McCoy et al. |
| 9,152,392 B2 | 10/2015 | Petro et al. |
| 9,532,116 B2 | 12/2016 | Terpe |
| 9,608,983 B2 | 3/2017 | Fee |
| 9,645,700 B2 | 5/2017 | Tsai |
| 9,693,013 B2 | 6/2017 | Nesamoney et al. |
| 9,824,372 B1 | 11/2017 | Seth et al. |
| 10,089,402 B1 | 10/2018 | Winkler et al. |
| 10,496,350 B2 | 12/2019 | Lazier et al. |
| 10,955,999 B2 | 3/2021 | Lotinsky et al. |
| 11,075,891 B1 | 7/2021 | Long et al. |
| 11,170,814 B1 | 11/2021 | Rajauria et al. |
| 11,183,217 B1 | 11/2021 | Liu et al. |
| 11,250,111 B2 | 2/2022 | Goldston et al. |
| 11,250,399 B2 | 2/2022 | Knock |
| 2007/0043713 A1 | 2/2007 | Elmi et al. |
| 2010/0149359 A1 | 6/2010 | Taoka |
| 2013/0021373 A1 | 1/2013 | Vaught et al. |
| 2013/0097477 A1 | 4/2013 | Adolf et al. |
| 2013/0145267 A1 | 6/2013 | Ramachandran |
| 2013/0276021 A1 | 10/2013 | Cho |
| 2014/0101537 A1 | 4/2014 | Antkowiak et al. |
| 2014/0106881 A1 | 4/2014 | Antkowiak et al. |
| 2014/0229331 A1 | 8/2014 | McIntosh et al. |
| 2014/0376876 A1 | 12/2014 | Bentley et al. |
| 2015/0177940 A1 | 6/2015 | Trevino et al. |
| 2015/0195175 A1 | 7/2015 | Kariman |
| 2015/0213516 A1 | 7/2015 | Jeremias |
| 2015/0278348 A1 | 10/2015 | Paruchuri et al. |
| 2016/0065929 A1 | 3/2016 | Barcons-Palau et al. |
| 2016/0088369 A1 | 3/2016 | Terpe |
| 2016/0093105 A1 | 3/2016 | Rimon et al. |
| 2017/0109584 A1 | 4/2017 | Yao et al. |
| 2017/0269816 A1 | 9/2017 | Bradley et al. |
| 2018/0068019 A1 | 3/2018 | Novikoff et al. |
| 2018/0132011 A1 | 5/2018 | Shichman et al. |
| 2018/0253765 A1 | 9/2018 | Avedissian et al. |
| 2018/0288396 A1 | 10/2018 | Bouazizi et al. |
| 2021/0014559 A1 | 1/2021 | Thapaliya |
| 2021/0295324 A1 | 9/2021 | Kerseboom et al. |
| 2021/0326852 A1 | 10/2021 | Yantis et al. |
| 2021/0358038 A1 | 11/2021 | Vandenberg et al. |
| 2021/0390531 A1 | 12/2021 | Voorhees et al. |
| 2021/0398095 A1 | 12/2021 | Mallett et al. |
| 2021/0405859 A1* | 12/2021 | Li ................. G06F 3/04847 |
| 2021/0406920 A1 | 12/2021 | McLancy |
| 2022/0053233 A1 | 2/2022 | Baxter et al. |
| 2022/0122161 A1 | 4/2022 | Perera |
| 2022/0353473 A1* | 11/2022 | Springer ............ H04L 12/1818 |
| 2023/0126108 A1* | 4/2023 | Roper ................... G06T 7/90 |
| | | 348/14.08 |

* cited by examiner

MANIPULATING VIDEO LIVESTREAM BACKGROUND IMAGES

RELATED APPLICATIONS

This application claims the benefit of U.S. provisional patent applications "Manipulating Video Livestream Background Images" Ser. No. 63/350,894, filed Jun. 10, 2022, "Product Card Ecommerce Purchase Within Short-Form Videos" Ser. No. 63/351,840, filed Jun. 14, 2022, "Search Using Generative Model Synthesized Images" Ser. No. 63/388,270, filed Jul. 12, 2022, "Creating And Populating Related Short-Form Video Segments" Ser. No. 63/395,370, filed Aug. 5, 2022, "Object Highlighting In An Ecommerce Short-Form Video" Ser. No. 63/413,272, filed Oct. 5, 2022, "Dynamic Population Of Contextually Relevant Videos In An Ecommerce Environment" Ser. No. 63/414,604, filed Oct. 10, 2022, "Multi-Hosted Livestream In An Open Web Ecommerce Environment" Ser. No. 63/423,128, filed Nov. 7, 2022, "Cluster-Based Dynamic Content With Multi-Dimensional Vectors" Ser. No. 63/424,958, filed Nov. 14, 2022, "Text-Driven AI-Assisted Short-Form Video Creation In An Ecommerce Environment" Ser. No. 63/430,372, filed Dec. 6, 2022, "Temporal Analysis To Determine Short-Form Video Engagement" Ser. No. 63/431,757, filed Dec. 12, 2022, "Connected Television Livestream-To-Mobile Device Handoff In An Ecommerce Environment" Ser. No. 63/437,397, filed Jan. 6, 2023, "Augmented Performance Replacement In A Short-Form Video" Ser. No. 63/438,011, filed Jan. 10, 2023, "Livestream With Synthetic Scene Insertion" Ser. No. 63/443,063, filed Feb. 3, 2023, "Dynamic Synthetic Video Chat Agent Replacement" Ser. No. 63/447,918, filed Feb. 24, 2023, "Synthesized Realistic Metahuman Short-Form Video" Ser. No. 63/447,925, filed Feb. 24, 2023, "Synthesized Responses To Predictive Livestream Questions" Ser. No. 63/454,976, filed Mar. 28, 2023, "Scaling Ecommerce With Short-Form Video" Ser. No. 63/458,178, filed Apr. 10, 2023, "Iterative AI Prompt Optimization For Video Generation" Ser. No. 63/458,458, filed Apr. 11, 2023, "Dynamic Short-Form Video Transversal With Machine Learning In An Ecommerce Environment" Ser. No. 63/458,733, filed Apr. 12, 2023, and "Immediate Livestreams In A Short-Form Video Ecommerce Environment" Ser. No. 63/464,207, filed May 5, 2023.

Each of the foregoing applications is hereby incorporated by reference in its entirety.

FIELD OF ART

This application relates generally to livestream videos, and more particularly to manipulating video livestream background images.

BACKGROUND

Short-form videos are gaining popularity. Individuals are now able to consume short-form videos from almost anywhere on any connected device at home, in the car, or even walking outside. Especially on mobile devices, social media platforms have become an extremely common use of internet-based video. Accessed through the use of a browser or specialized app that can be downloaded, these platforms include various services. While these services vary in their video capabilities, they are generally able to display short video clips, repeating video "loops", livestreams, music videos, etc. These videos can last anywhere from a few seconds to several minutes. Short-form videos cover a variety of topics. Important subcategories of short-form videos include livestreams and livestream replays.

Many mobile electronic devices, such as smartphones, tablet computers, and wearable computing devices, include one or more cameras onboard. Some devices may include multiple cameras, including wide-angle, ultrawide, and telephoto lenses, along with stereo microphones. Advanced image processing such as stabilization, high dynamic range (HDR), selective focus, and various other video effects empower individuals to create content on their mobile device that would have required a professional studio just a short time ago. Modern mobile devices can support on-device editing through a variety of applications (apps). The on-device editing can include splicing and cutting of video, adding audio tracks, applying filters, and the like. Furthermore, modern mobile devices are typically connected to the Internet via high-speed networks and protocols such as WiFi, 4G/LTE, 5G/OFDM, and beyond. Each time internet speed and bandwidth has improved, devices and technologies have been created to introduce new capabilities.

Livestreaming refers to video that is distributed over a network in near real-time, without first being recorded in its entirety. Livestreaming can include broadcast livestreams, which are one-to-many connections that are sent to multiple devices simultaneously via broadcast or multicast network connections. Livestreaming may utilize various real-time communication protocols such as Real-Time Streaming Protocol (RTSP), HTTP Live Streaming (HLS), Secure Reliable Transport (SRT), and/or other suitable protocols. Livestreaming typically starts with raw image capture from a digital video camera. The raw data is compressed and encoded using a video encoding process. The video encoding process can include H.264, MPEG-2, or some other suitable encoding process. This process may occur in chunks or segments, with each segment being a few seconds in duration. The segments are then uploaded to a content delivery network (CDN) for distribution to multiple electronic devices such as smartphones, tablet computers, laptop computers, and the like. This infrastructure now enables an individual with such an electronic device and a connection to the Internet to create a livestream video and share it with the world.

Livestream videos can be stored in a server and viewed again later. Livestream videos viewed at a later time, after completion of the livestream video, are referred to as livestream replays. The rise of livestream video has led to a new level of content distribution and content consumption. This has implications in many areas, such as news, sports, education, entertainment, and more. With the steady improvements in capabilities of personal electronic devices, the role of livestream videos in these areas, and others, is likely to increase in the future.

SUMMARY

Short-form videos, including livestream videos, can be generated on a wide variety of electronic devices including smartphones, tablet computing devices, televisions, laptop computers, desktop computers, digital video cameras, and more. Livestream videos are becoming more and more relevant for dissemination of information and entertainment. The information can include news and weather information, sports highlights, product information, reviews of products and services, product promotion, educational material, how-to videos, advertising, and more. Generation of livestream videos is therefore taking on a new importance in light of these trends.

Generation of a manipulated livestream is accomplished by analyzing a livestream video to identify foreground objects and background objects. Within the foreground objects, a product is identified, using one or more processors. A virtual background is defined based on the product within the foreground objects. A new, manipulated video stream is created in which the foreground objects are rendered with the virtual background as the background for the manipulated video. In the manipulated video, the virtual background can replace or augment an actual background.

Livestream videos can be used for product demonstrations. A host individual is a person who may discuss multiple products during the course of a livestream video. The products can be offered from a single vendor, or from a variety of vendors. The products offered from a variety of vendors may all be related (e.g., automotive products). As the host individual transitions from discussing a first product to discussing a second product, the transition is detected by computer-implemented techniques and a new virtual background is selected and rendered in the manipulated video. The new virtual background can be selected based on the second product, actions and/or spoken words of the host individual, and/or other criteria.

The virtual background can be a static image such as a graphic illustration, text, and/or photograph. The virtual background can be a dynamically changing image such as an animation, video clip, animated GIF, and/or some other dynamically changing image. The virtual backgrounds can be created a priori, or defined "on-the-fly" as a transition occurs. The virtual background can be defined and/or selected to correspond to the product currently being discussed by a host individual. The virtual background can be defined and/or selected based on information in an audio track associated with the livestream video. In embodiments, the virtual background can be defined and/or selected based on machine learning. Supervised and/or unsupervised learning can be used for defining and/or selecting virtual backgrounds utilizing artificial intelligence, neural networks, deep learning, and/or other suitable techniques.

Virtual backgrounds of disclosed embodiments can enable new forms of monetization. This can include, but is not limited to, sponsored virtual backgrounds, and auctioned virtual backgrounds. In embodiments, an interested party, such as a vendor, promotion company, and/or inventor, can sponsor and/or place an auction bid on the placement of a virtual background within a short-form video. The virtual backgrounds can include coupons. The coupons can be offered for a product that a host individual is currently discussing. The coupons can include text, barcodes, QR codes, and/or other images or symbols that are scannable by an electronic imaging device such as a camera of a smartphone. A wide variety of marketing and product promotion capabilities are enabled by disclosed embodiments.

A computer-implemented method for video manipulation is disclosed comprising: analyzing a short-form video to identify foreground objects and background objects; identifying a product, using one or more processors, within the foreground objects within the short-form video; defining a virtual background based on the product within the foreground objects; rendering the foreground objects with the virtual background; and creating a new video stream based on the rendering of the foreground objects with the virtual background. Some embodiments comprise determining an insertion point for a new virtual background within the short-form video. Some embodiments comprise starting the rendering of the foreground objects with the virtual background at the insertion point. In embodiments, the defining the virtual background comprises selecting a background from a plurality of background possibilities.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
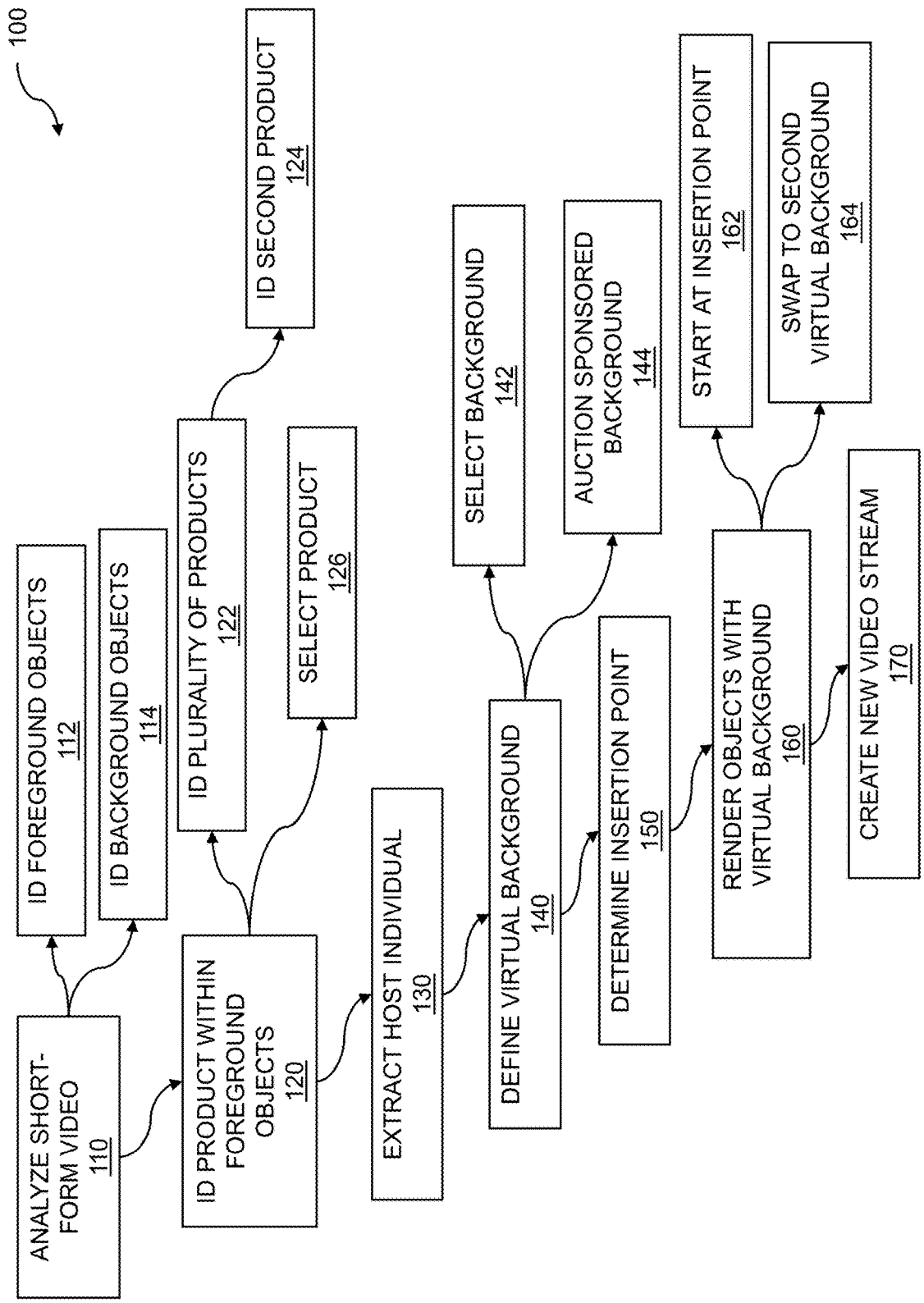
FIG. 1 is a flow diagram for manipulating video livestream background images.

Techniques for manipulating video livestream background images are disclosed. A short-form video, such as a livestream video or livestream replay video, can be analyzed for context. As context changes, a new virtual background is inserted in a video. The new virtual background is based on the context. The context can include a product. The virtual background can include coupons and/or promotional offers related to the product. A subject matter of a video is obtained via computer-implemented techniques, such as natural-language processing (NLP) and/or entity detection, and a virtual background is defined, selected, rendered, and/or inserted in response to the detected subject matter. The virtual background changes automatically as different products are discussed and/or showcased. The virtual backgrounds can be sponsored and/or auctioned to enable additional revenue for content creators. The short-form video can include a livestream. The short-form video can include a livestream replay. The virtual backgrounds can have an expiration date. When a livestream replay is requested, an assessment can be made to determine if any of the virtual backgrounds in the livestream replay have expired. This assessment can include querying metadata associated with the livestream replay. The metadata associated with the livestream replay can include expiration dates and insertion times of each virtual background. Any virtual backgrounds that have expired can be removed and/or swapped with new virtual backgrounds.

Computer-implemented techniques may be used for performing entity detection, as well as detecting a change in subject based on speech and/or actions of a host individual. The subject can include a particular product. The detecting a change in subject can include detecting a foreground object and identifying the foreground object as a product. The identification of the foreground object as a product can include performing optical character recognition on text imprinted on a foreground object, and/or implementing other image recognition techniques. Further, the identification of the foreground object as a product can include scanning of an optical code such as a barcode that is imprinted on the product.

The Internet, and its various streaming services, have provided an unprecedented amount of content available for viewing. The constantly increasing amount of available content creates competition for views. In this environment, for a video to become popular, compelling content is needed. The potential for a wide-reaching distribution with a large and diverse audience makes livestream video a suitable mechanism for product promotion and demonstration. Disclosed embodiments enable creation of compelling content that enhances entertainment value by automatically defining and/or selecting a virtual background for use in a video, as well as defining and/or selecting a new virtual background for use in the video based on changes that occur in the video. The changes can include discussion of products within a video. A determination that a product is the current subject of a livestream video can be based on motion of the product. For example, when a host individual picks up an object, the motion of the object can be detected and a virtual background can be defined and/or selected based on the motion of the object.

Disclosed embodiments can automatically, without human intervention, define a virtual background based on activity occurring in a livestream video. When the activity changes, such as a host individual discussing a different product, disclosed embodiments automatically define and/or select a new virtual background and insert the virtual background in a manipulated livestream video. This is an important advantage for product promotion in today's ultra-competitive environment where literally millions of videos are competing for a viewer's attention.

Defining and/or selecting a virtual background can be based on metadata. The metadata can include hashtags, repost velocity, user attributes, user history, ranking, product purchase history, view history, host identity, host attributes, or user actions. The user actions can include, but are not limited to, zoom, volume increase, number of times the video is paused, the duration of time that the video is paused, number of replays, number of reposts, number of likes, comments, or clicks on advertisements. The user actions can include entries in a chat window. The entries may be analyzed by machine learning that performs natural language processing. The natural language processing can be used to determine a subject of the entry in the chat window. The detected subject can be used as a criterion to select a virtual background for use in a manipulated livestream video. In embodiments, the defining the virtual background is based on metadata. In some embodiments, the metadata includes hashtags, repost velocity, user attributes, user history, ranking, product purchase history, view history, host identity, host attributes, or user actions.

Virtual backgrounds can be used to create additional monetization opportunities. Stakeholders, such as vendors, promoters, and/or inventors, can sponsor a livestream video or a segment of a livestream video by purchasing a placement of a virtual background within a short-form video. In some embodiments, the price of the placement of the virtual background can be based on how long the virtual background will be displayed. As an example, an option may be provided to purchase a 30 second virtual background placement, a 60 second virtual background placement, and so on. A longer duration virtual background placement can be offered for a higher price than a shorter virtual duration background placement. Thus, in embodiments, an auction bid is based on a length of time the sponsored virtual background is displayed. In some embodiments, the selecting the background from a plurality of background possibilities is based on an auction bid related to the product. In some embodiments, virtual backgrounds can expire after a certain duration. A new virtual background may be swapped based on expiration of a previous virtual background. In embodiments, the swapping is based on a time interval.

Virtual backgrounds can include coupons, product promotions, and/or other special offers. In some embodiments, an optical code such as a barcode or QR (quick response) code may be included in a virtual background. In some embodiments, the optical code may be inserted in real time, and may have an expiration period defined. As an example, a QR code may provide a user with a discount coupon when scanned with his/her mobile device. The QR code may be valid for a limited time. In embodiments, the QR code is valid for a time period ranging from five minutes to one hour. The QR code can be used to enable additional product promotion opportunities.

The virtual backgrounds can be selected based on an auction process. In embodiments, users may place bids on a virtual background to be included in an upcoming livestream. As an example, a popular content creator who discusses computer topics may auction virtual backgrounds for use on his/her livestream videos. Vendors who provide computer services may want to bid for virtual backgrounds for use on relevant livestream videos. The bidding can take place using a fiat currency such as US dollars. The bidding can take place using virtual currencies, including cryptocurrencies such as Bitcoin. With disclosed embodiments, content creators obtain additional monetization opportunities, while providers of relevant services have opportunities to obtain advertising with potentially millions of impressions. The automatic swapping of virtual backgrounds creates compelling content, which is vital in today's ultra-competitive environment where literally millions of videos are competing for a viewer's attention.

FIG. 1 is a flow diagram 100 for manipulating video livestream background images. A short-form video is analyzed to identify foreground objects and background objects. One or more products are identified within the foreground objects within the short-form video. A virtual background based on the product within the foreground objects is defined. The foreground objects are rendered with the virtual background. A new video stream is created, based on the rendering of the foreground objects with the virtual background.

Short-form videos can include livestreams, livestream replays, sports highlights, comedy routines, how-to videos, cooking lessons, news, weather, traffic, advertisements, product reviews, and other genres of content. In embodiments, videos are analyzed, and background and foreground objects are identified. Foreground objects may be identified as products. A virtual background may be defined and/or selected and inserted into a manipulated video. The virtual background may be related to, and/or associated with, the foreground object. In embodiments, a livestream replay can be a rerunning of a previously recorded livestream video. The replay can be rerun immediately after the livestream was recorded, shortly later, or even at a much later time than the original recording of the livestream. The livestream replay can be a direct rerunning of the livestream or can be an edited version of the livestream.

The flow 100 includes analyzing a short-form video 110. The analyzing can include utilizing image processing techniques such as edge detection and/or gradient filtering to identify objects. The analyzing can include identifying foreground objects 112 and identifying background objects 114. In some embodiments, background objects can be removed from the manipulated short-form video. Embodiments can utilize camera focus information to determine if an object is a background object or a foreground object. Embodiments can utilize electronic range-finding information to determine if an object is a background object or a foreground object. The range-finding can be based on sonar, infrared, LiDAR, laser, and/or some other suitable technology. In embodiments, a laser is directed from a camera or point near a camera to an object. A calculation is performed via laser distance measuring techniques using phase shift, in which a laser beam is directed at an object, and the phase of its reflection is compared with the phase of the outgoing beam. In some embodiments, a time-of-flight method is used in which the time it takes for an optical pulse to reflect and return is calculated. This information can be used to determine a distance of an object from a reference point, and to classify the object as a foreground object or a background object.

In embodiments, a foreground object is defined as an object that is within a predetermined distance from a camera. As an example, some embodiments define objects that are within three meters of a camera as foreground objects with respect to that camera. Similarly, in some embodiments, a background object is defined as an object that is beyond a predetermined distance from a camera. As an example, some embodiments define objects that are beyond three meters of a camera as background objects with respect to that camera.

The flow 100 includes identifying a product within the foreground objects 120. The identification of products can include performing image analysis on a foreground object to determine if it is a product. In embodiments, the image analysis can include reading a barcode or other optical pattern on the foreground object to determine if it is a product. The image analysis can include comparing the foreground object to a library of product images, and identifying the foreground object as a product if it matches or has similarities to a product image from the library. Embodiments utilize machine learning, image classifiers, neural networks, and/or other artificial intelligence techniques for determining that a foreground object is a product. The flow includes selecting a product 126 from the foreground objects.

The flow 100 can include identifying a plurality of products 122, using aforementioned techniques. The flow can further include identifying a second product 124 from the plurality of products, using the aforementioned techniques. In an application such as a promotional livestream video, there can be multiple products presented in the video. Each product can be identified and associated with a different virtual background for use in a manipulated video stream. The flow includes extracting a host individual 130. A host individual can be a person who is discussing one or more products during a short-form video such as a livestream. In some embodiments, the host individual is identified/extracted via facial recognition, voice recognition, and/or other suitable techniques. The flow includes defining a virtual background 140. In some embodiments, a virtual background is defined and/or selected based on the identity of the host individual, and/or the selected product(s).

The flow 100 includes selecting a background 142. The selected background is a background to be used in an upcoming portion of a video. The flow can include auctioning a sponsored background 144. Embodiments can enable users to bid on use of a specific background for a portion of the video. In embodiments, the bid price is related to the display duration for a virtual background. The auctioning can be implemented via an online marketplace or other suitable e-commerce system. The flow includes determining an insertion point 150. The insertion point is a point in time where a virtual background is to be rendered in a video. The insertion point can be based on an absolute time, a time interval, a change of subject matter, motion of a foreground object, spoken words of a host individual, motion/gestures of a host individual, and/or other criteria. The flow includes rendering objects with the virtual background 160. In embodiments, the rendering of the virtual background can utilize a chroma key process, such as a "green screen". When a colored background has been keyed, it is treated as transparent. Then, that transparent area is composited with a different image or video. Other embodiments can utilize background identification techniques, such as machine-learning based background identification, that do not utilize chroma keying.

The flow 100 can include starting rendering of a virtual background at an insertion point 162. The flow can further include swapping to a second virtual background 164 at a second insertion point later in time. The swapping to the second virtual background can be based on motion of a second foreground object, such as a second product, actions of a host individual (such as gestures, and/or verbal utterances), and/or other criteria. The flow includes creating a new video stream 170. The new video stream can be a manipulated version of the video analyzed at 110. The new video stream can show a virtual background that is temporally coordinated with motion and/or emphasis of a foreground object. The swapping to the second virtual background 164 can be performed abruptly, with a hard transition. Alternatively, in some embodiments, the swapping to the second background is performed via a gradual transition. In one embodiment, the transition includes a fade out of the first virtual background concurrently with a fade in of the second virtual background. In some embodiments, another transition such as a wipe, dissolve, or another transition type is used to transition from the first virtual background to the second virtual background. In some embodiments, an audible audio clip is encoded in the video at the time of the swapping. In this way, the viewers can hear a sound that coincides with the swapping of the virtual background, creating an extra attention-getting element at the time of changing to a new virtual background.

Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
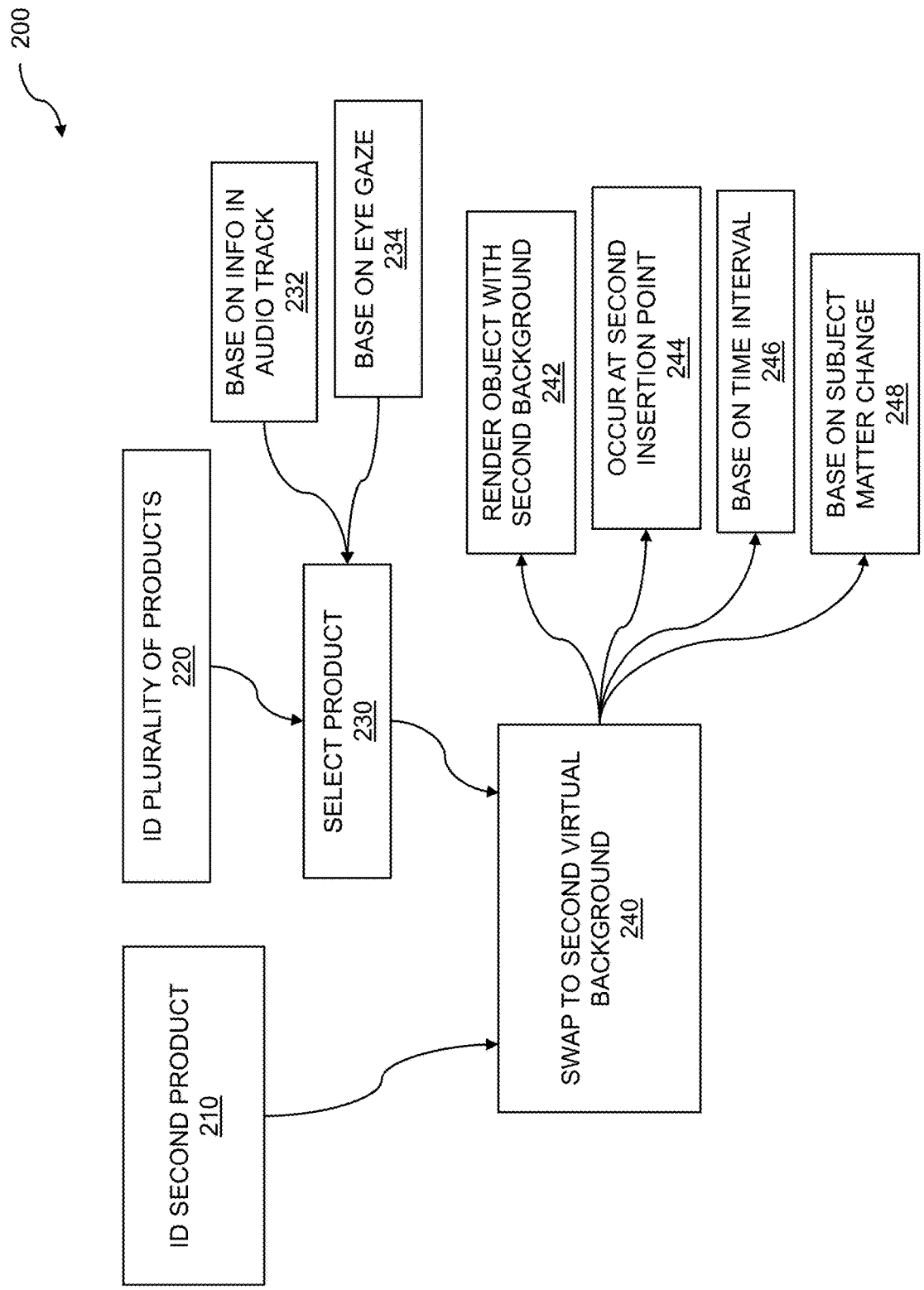
FIG. 2 is a flow diagram for identification of a second object.

FIG. 2 is a flow diagram for identification of a second object. Second object identification can enable manipulating video livestream background images. A short-form video is analyzed to identify foreground objects and background objects. One or more products are identified within the foreground objects within the short-form video. A virtual background based on the product within the foreground objects is defined. The foreground objects are rendered with the virtual background. A new video stream is created, based on the rendering of the foreground objects with the virtual background.

The flow 200 includes identification of a second product 210. In embodiments, a second foreground object can be identified and determined to be a second product. The determination can be based on image analysis of a foreground object. In embodiments, the image analysis can include reading a barcode or other optical pattern on the foreground object to determine if it is a product. The image analysis can include comparing the foreground object to a library of product images, and identifying the foreground object as a product if it matches or has similarities to a product image from the library.

In embodiments, for each identified product, a corresponding virtual background is defined. When it is determined that the subject of the video transitions from a first product to a second product, the corresponding virtual background can be swapped from a first virtual background corresponding to the first product to a second virtual background 240 corresponding to the second product. This enables the creation of more engaging content that enhances entertainment value.

The flow 200 includes identification of a plurality of products 220. In some cases, the products are offered from a single vendor, or from a variety of vendors. Each of the products can be from a similar category (e.g., automotive), or from a variety of categories that can be related or unrelated to each other. The flow includes selection of a product 230. The selection of the product can be based on information in an audio track 232. The information can include a combination of tones. The information can include utterances and/or speech from a host individual. The speech can be processed by a speech-to-text process for further analysis. In embodiments, the defining the virtual background is based on the host individual's spoken words. The analysis can include natural-language processing (NLP), entity detection, disambiguation, and/or other language processing techniques. Entity detection can be used to trigger a change in the virtual background based on a subject matter change. The aforementioned techniques can be performed by machine learning systems, artificial intelligence, neural networks, deep learning, and/or other suitable techniques. Embodiments can include identifying a plurality of products within the foreground objects within the short-form video. Embodiments can include selecting the product within the plurality of products.

The selection of the product can be based on eye gaze 234. The eye gaze can be the eye gaze of a host individual. The eye gaze can be the eye gaze of a viewer of a short-form video. Embodiments convert eye movements of an individual into a data stream that contains information such as pupil position, the gaze vector for each eye, and gaze point. A gaze point that coincides with a foreground object can be used as a criterion for selecting that product and rendering a virtual background corresponding to that product. Embodiments track a variety of eye movements, including, but not limited to, fixations, saccades, and smooth pursuits. Fixations occur when the eye stops to collect visual data. Saccades are fast "jumps" that the eye performs between fixations in a static environment in which the eyes move from one object of interest to another with the goal of acquiring new visual data. Smooth pursuit is the eye movement that takes place when looking at an object in motion and following it. As visual intake is possible during smooth pursuit, the movement is relevant for tracking eye movements. In some embodiments, smooth pursuit motion and/or fixation is used for determining a product that is currently being discussed and/or demonstrated in a video, and generating an event for causing systems of disclosed embodiments to swap a virtual background.

When a first product (object) is the subject of a video, a first virtual background can be used. Detection of a transition to a second product (object) can be based on eye gaze 234, information in an audio track 232, subject matter change 248, a time interval 246, motion of a product, action of a host individual, action of a viewer, or other criteria. When the detection of transition to a second product (object) occurs, a second virtual background is selected, and the object is rendered with a second virtual background 242. The display of the second virtual background can occur at a second insertion point 244. In general, each virtual background can have metadata associated with it, including, but not limited to, insertion point, removal point, transition type, identification number, vendor, product description, expiration date, and/or other metadata fields. In embodiments, the selecting is based on information in an audio track associated with the short-form video.

Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors.

Figure 3:
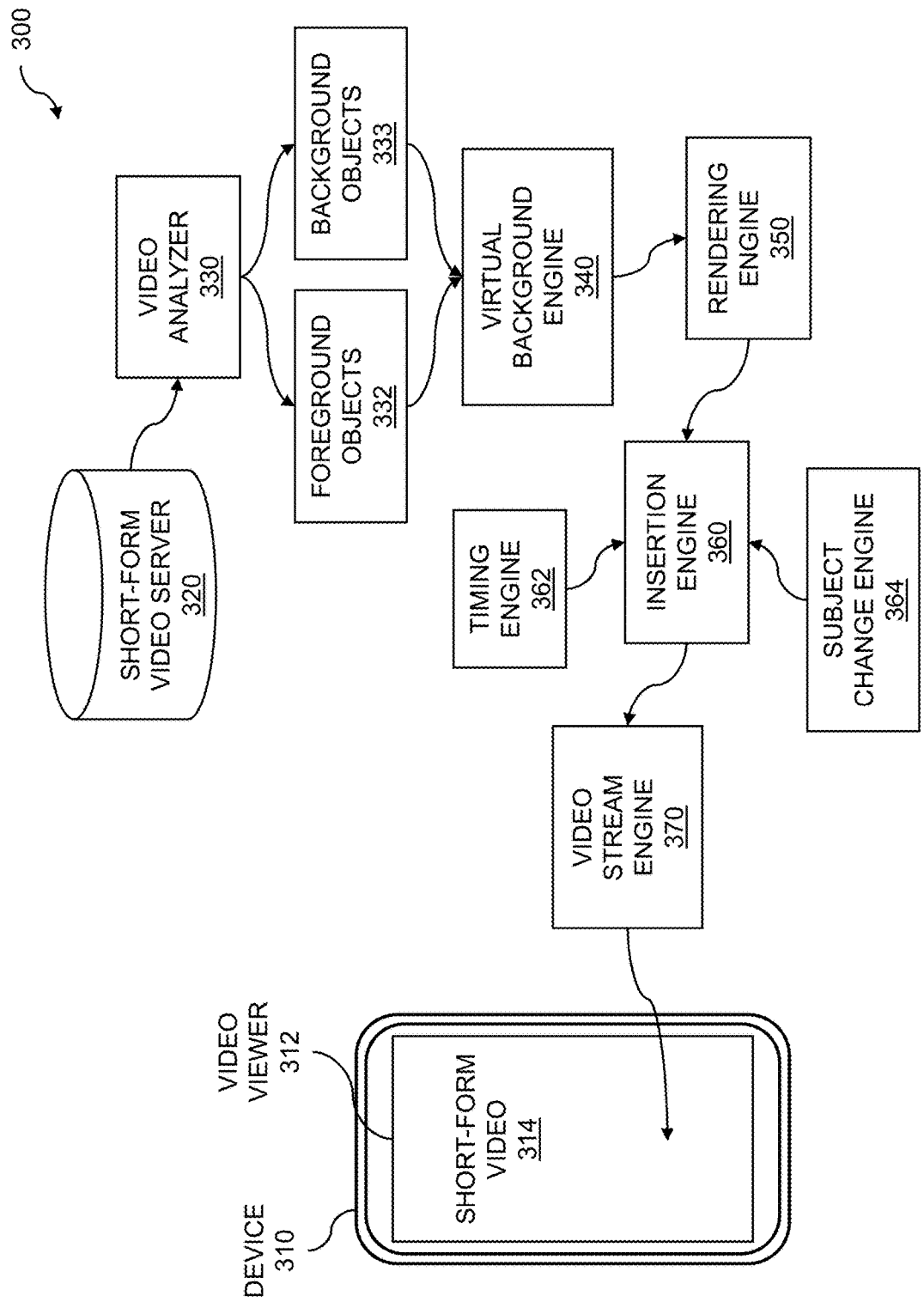
FIG. 3 is a block diagram for manipulation of livestream backgrounds.

FIG. 3 is a block diagram for manipulation of livestream backgrounds. Components of the block diagram can enable manipulating video livestream background images. A short-form video is analyzed to identify foreground objects and background objects. One or more products are identified within the foreground objects within the short-form video. A virtual background based on the product within the foreground objects is defined. The foreground objects are rendered with the virtual background. A new video stream is created, based on the rendering of the foreground objects with the virtual background.

The block diagram 300 can include a short-form video server 320. The short-form video server can include a local server, a remote server, a cloud server, a distributed server, and so on. The short-form video server can deliver a short-form video from a plurality of short-form videos. The short-form videos stored on the server can be uploaded by individuals, content providers, influencers, tastemakers, and the like. The short-form videos on the server 320 can form a library of short-form videos. The short-form videos can include livestreams and livestream replays. In embodiments, the short-form video is obtained from a library of short-form videos.

Videos from the video server 320 are input to a video analyzer 330. The video analyzer identifies foreground objects 332 and background objects 333. Based on the identification of foreground objects and background objects, a virtual background engine 340 defines a virtual background. The virtual background definition can include metadata. The metadata can include a color scheme, a vendor name, associated graphical elements (such as icons, company logos, and the like), a duration, subject matter keywords, and/or other metadata fields. In embodiments, selecting the background from a plurality of background possibilities is based on the analyzing the short-form video.

The virtual background engine 340 provides the virtual background definition to a rendering engine 350. The rendering engine 350 creates an image, or series of images, based on the virtual background definition. The output of the rendering engine 350 can include a bitmap file, JPEG file, PNG file, video file, GIF, animated GIF, and/or other suitable formats. In embodiments, the virtual background comprises a dynamically changing image. In some embodiments, the virtual background comprises a static image. A subject change engine 364 detects a change in subject of a short-form video. The subject change engine 364 can analyze the speech of a host individual. The speech can be processed by a speech-to-text process for further analysis.

The analysis can include natural-language processing (NLP), entity detection, disambiguation, and/or other language processing techniques. Entity detection can be used to trigger a change in a virtual background based on subject matter change.

A timing engine 362 can use timestamp information of a video, such as a decoding timestamp and/or presentation timestamp, along with a program clock reference (PCR) to determine a timestamp associated with a subject change. The insertion engine 360 receives the timestamp information from the timing engine 362 and a subject change notification from the subject change engine 364, and associates a timestamp with a subject change. The insertion engine provides the virtual background to a video stream engine 370. The video stream engine can include a compositor that performs chroma keying to insert a new virtual background in a short-form video, thereby creating a manipulated short-form video 314 that is rendered on an electronic computing device 310 via a video viewer 312. The video viewer can include a video app, a web browser, and so on. The short-form video 314 can be displayed on a portion of the display associated with the device 310.

Figure 4:
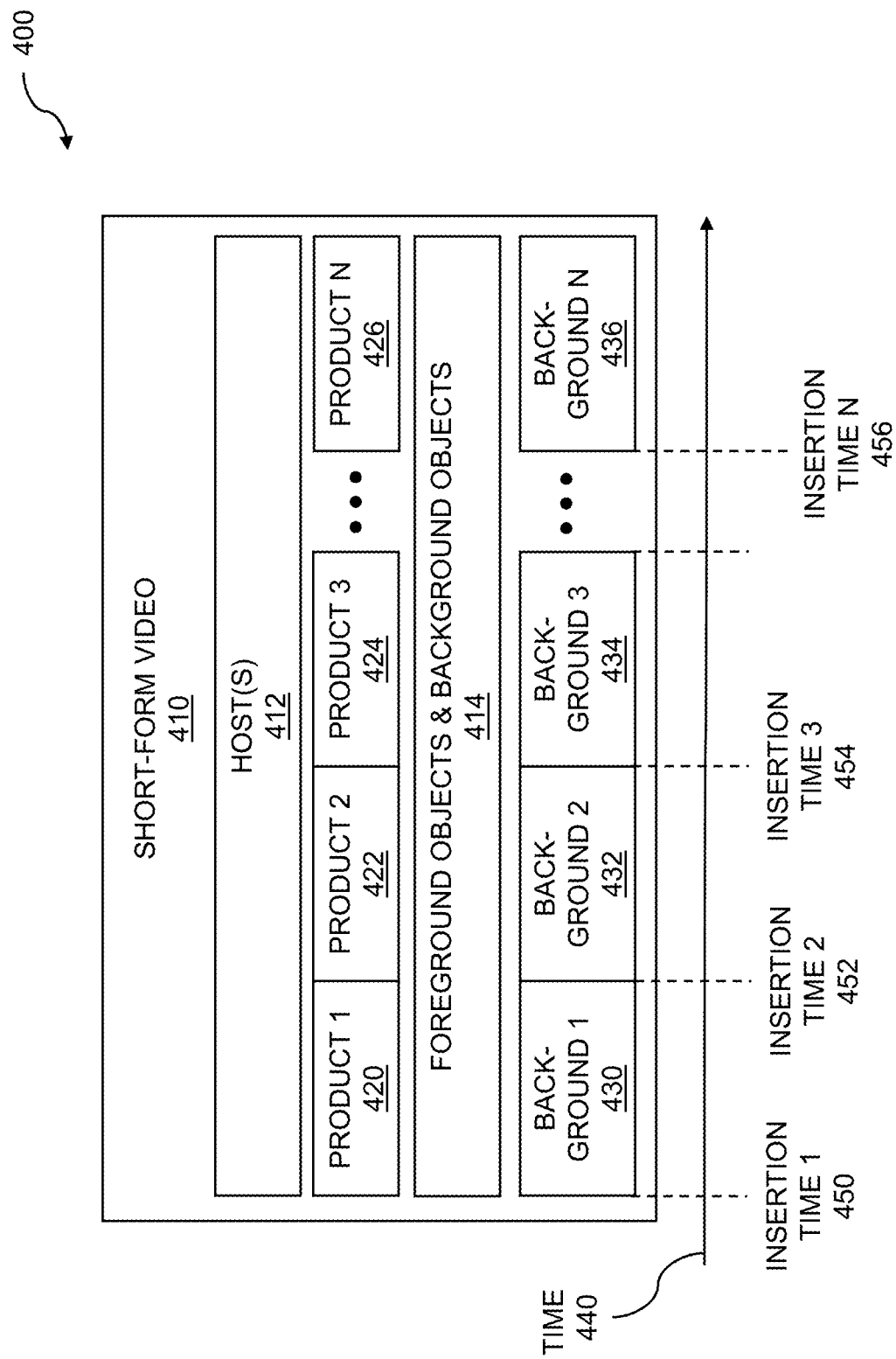
FIG. 4 illustrates a short-form video with virtual background swapping.

FIG. 4 illustrates a short-form video with virtual background swapping. Virtual background swapping can enable manipulating video livestream background images. A short-form video is analyzed to identify foreground objects and background objects. One or more products are identified within the foreground objects within the short-form video. A virtual background based on the product within the foreground objects is defined. The foreground objects are rendered with the virtual background. A new video stream is created, based on the rendering of the foreground objects with the virtual background.

The virtual backgrounds can be swapped in response to activity relating to a product in a short-form video. The activity can include motion of the product (e.g., a host individual picking up a product from a table), speech pertaining to the product (e.g., a host individual mentioning the product), eye gaze (e.g., a host individual looking at the product), and/or other activities. In embodiments, there are multiple different products, with each product having a corresponding virtual background. As different products are discussed and/or showcased during a short-form video, the corresponding virtual background is automatically inserted, and a new video, which is a manipulated version of an original video, is created. The new video has virtual backgrounds that change as different products are discussed and/or showcased.

The illustration 400 includes a time axis 440. A short-form video 410 can include one or more hosts 412. The hosts are individuals who can discuss and/or demonstrate products in a short-form video. The hosts can appear sequentially within the short-form video, where the hosts discuss different products. The hosts can appear concurrently within the short-form video, where the hosts discuss a particular product together. The short-form video 410 covers a plurality of products, indicated as product 1 420, product 2 422, product 3 424, up to product N 426. Each product has a corresponding virtual background. Background 1 430 corresponds to product 1 420. Background 2 432 corresponds to product 2 422. Background 3 434 corresponds to product 3 424. Background N 436 corresponds to product N 426.

While four products are shown in the illustration 400, in practice there can be hundreds of products discussed in a short-form video. The short-form video 410 comprises one or more foreground objects, and can also comprise one or more background objects 414. In embodiments, background objects may be ignored for the purposes of product identification. Foreground objects can be analyzed to determine if they are products. Virtual backgrounds can be defined, selected, and rendered for foreground objects. Each virtual background has an insertion time. The insertion time is a time within a video where the virtual background is to be included in a manipulated short-form video.

In embodiments, each virtual background has a removal time or default duration. In some embodiments, a first virtual background is removed when a second virtual background is to be inserted. In some embodiments, a virtual background is removed when its removal time is reached, or when its duration has expired. Background 1 430 corresponds to insertion time (point) 1 450. Background 2 432 corresponds to insertion time 2 452. Thus, embodiments can include swapping to a second virtual background based on the second product. Background 3 434 corresponds to insertion time 3 454. Background N 436 corresponds to insertion time N 456. In embodiments, the insertion times are computed by the insertion engine 360, as previously described. Embodiments can include starting the rendering of the foreground objects with the virtual background at the insertion point.

Figure 5:
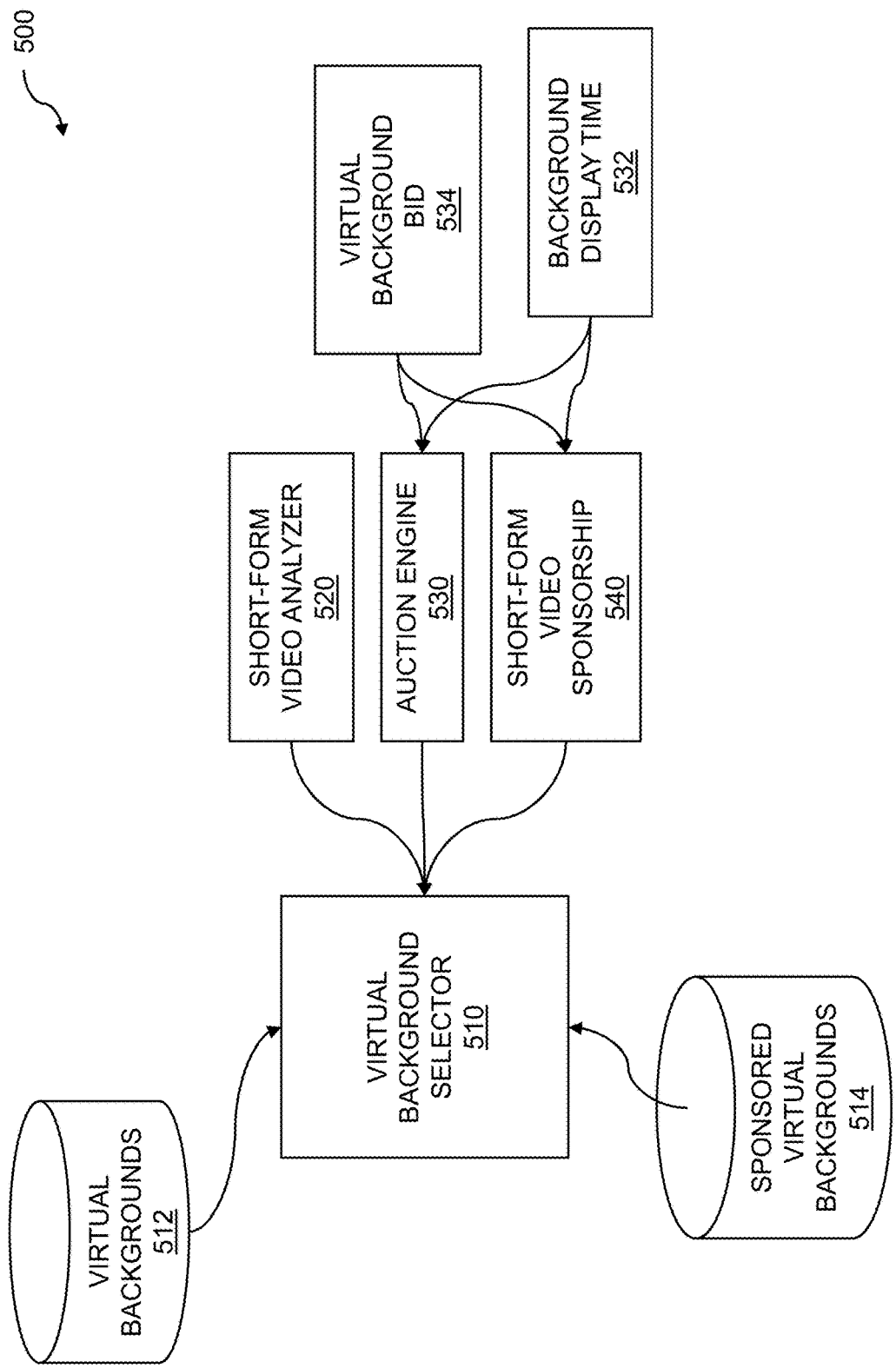
FIG. 5 is a block diagram of sponsoring and bidding on backgrounds.

FIG. 5 is a block diagram of sponsoring and bidding on backgrounds. Sponsoring and bidding on backgrounds can enable manipulating video livestream background images. A short-form video is analyzed to identify foreground objects and background objects. One or more products are identified within the foreground objects within the short-form video. A virtual background based on the product within the foreground objects is defined. The foreground objects are rendered with the virtual background. A new video stream is created, based on the rendering of the foreground objects with the virtual background.

Block diagram 500 includes a virtual background selector 510, which selects virtual backgrounds 512 and/or sponsored virtual backgrounds 514 for insertion into short-form videos. A short-form video analyzer 520 analyzes short-form videos to identify foreground objects, and to determine if any of the foreground objects are products. The short-form video sponsorship 540 can include the sale of a virtual background placement. In some embodiments, the selecting the background from a plurality of background possibilities is based on a sponsorship of the short-form video. Alternatively, virtual backgrounds can be sold via auction engine 530, which can receive a virtual background bid 534. Multiple bids can be received. In embodiments, the user associated with the winning bid gets his/her virtual background included in a new version of the short-form video.

Embodiments utilize a variety of auction types for auctioning of a virtual background, and/or placement of a virtual background. Some embodiments may utilize an absolute auction, in which the highest bid wins, regardless of price. Other embodiments utilize a minimum bid auction, in which there is a minimum bid amount required before there can be a sale of a virtual background placement (insertion opportunity). Other embodiments utilize a reserve auction, in which the seller can accept, reject, or counter the winning bid. Other embodiments utilize a Dutch auction, in which the bidding for a virtual background placement starts at a very high price and is progressively lowered until a buyer claims the virtual background placement. A variety of other auction types can be used in disclosed embodiments.

In the block diagram 500, the bid and/or short-form video sponsorship 540 price can be based on background display time 532. In some embodiments, the background display time is predetermined. In some embodiments, an option is provided to bid on various durations. As an example, an option can be provided to bid on a 60 second duration and a 120 second duration. The starting bid can differ depending on the duration. In embodiments, selecting the background from a plurality of background possibilities comprises auctioning a sponsored virtual background.

Figure 6A:
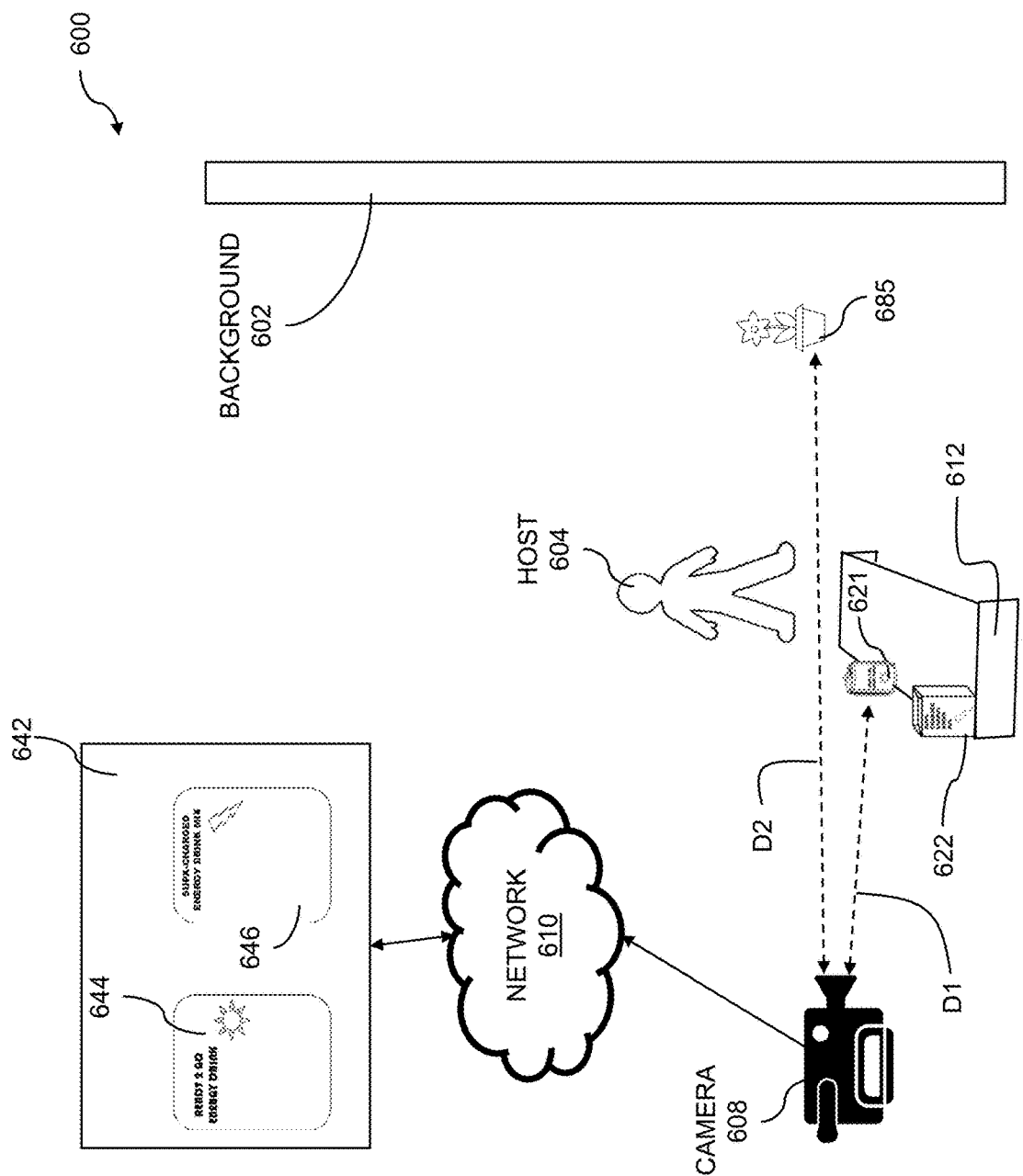
FIG. 6A illustrates a side-view example livestream with multiple products.

FIG. 6A illustrates a side-view example livestream with multiple products. A livestream with multiple products can enable manipulating video livestream background images. A short-form video is analyzed to identify foreground objects and background objects. One or more products are identified within the foreground objects within the short-form video. A virtual background based on the product within the foreground objects is defined. The foreground objects are rendered with the virtual background. A new video stream is created, based on the rendering of the foreground objects with the virtual background.

In the illustration 600, a camera 608 is connected to a network 610. The network 610 can include a local area network, wide area network, or other suitable network. The network 610 can include the Internet. A virtual background server 642 is also connected to network 610. The virtual background server 642 contains multiple virtual backgrounds, indicated as 644 and 646. While two virtual backgrounds are shown in virtual background server 642, in practice, there can be many thousands of virtual backgrounds stored within virtual background server 642. In some embodiments, the virtual backgrounds are created a priori and stored in the virtual background server 642. When a product is identified in a livestream video, the virtual background server 642 is searched to see if a corresponding virtual background exists. If so, the corresponding virtual background is selected. In some embodiments, the corresponding virtual background is further augmented with additional text and/or graphical elements. In some embodiments, the additional elements include a coupon and/or QR code. The QR code can also be a coupon. In some embodiments, the QR code can resolve to a webpage link that contains additional information about the product being discussed/demonstrated.

A background 602 is used as a backdrop for a performance area. The background can be monochromatic to facilitate effective chroma keying. Thus, the background 602 can be a "green screen," "blue screen," or some other color to facilitate insertion of virtual backgrounds. A host individual 604 is discussing/demonstrating a first product 621 and a second product 622 that are placed on a table 612. Product 621 is at a distance D1 from camera 608, and object 685 is at a distance D2 from camera 608, where D1<D2. Product 621 is deemed to be a foreground object, based on distance D1 being below a predetermined threshold, while object 685 is deemed to be a background object based on distance D2 exceeding the predetermined threshold. In some embodiments, the predetermined threshold has a value ranging from two meters to three meters. The distances D1 and D2 can be determined by the camera 608 utilizing rangefinding techniques such as infrared, LiDAR, laser, and/or another suitable technology. In some embodiments, background objects can be excluded from the new short-form video.

Figure 6B:
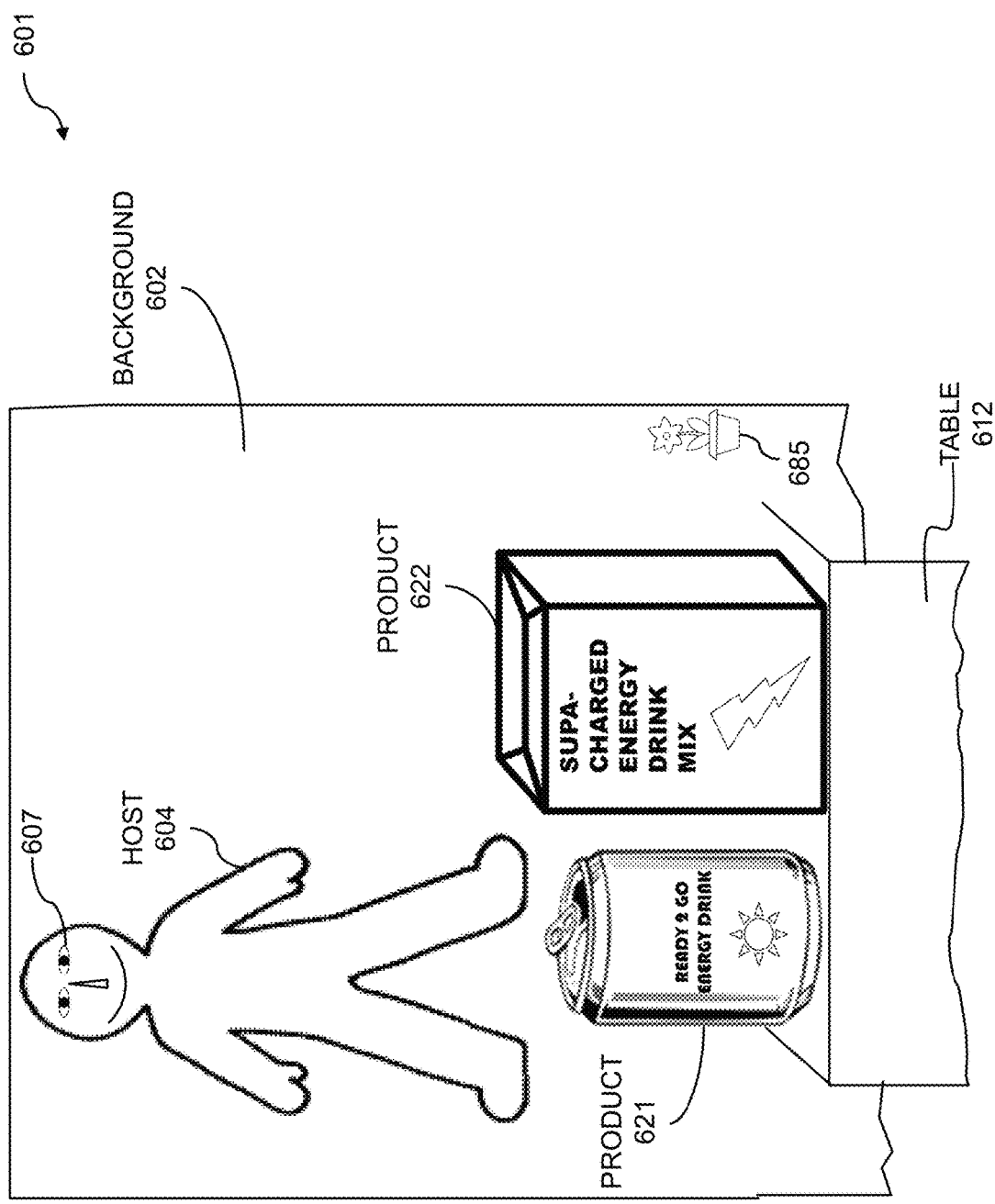
FIG. 6B illustrates a view of the performance area.

FIG. 6B illustrates a view of the performance area, as viewed from camera 608 of FIG. 6A. In the illustration 601, a first product 621 and a second product 622 are placed on a table 612 in front of background 602. A host individual 604 discusses and/or demonstrates the products. Gestures and/or movements of the host individual can be used as criteria for virtual background definition, selection, rendering, and/or insertion. Thus, embodiments can include extracting a host individual in the short-form video and performing the defining of the virtual background using information from the host individual. In embodiments, the defining of the virtual background is based on host individual actions. In embodiments, the eyes 607 of the host individual 604 are tracked to determine which product the host individual is looking at. In some embodiments, the eye gaze is used as a criterion for virtual background selection and/or insertion. In embodiments, the selecting is based on eye gaze of a host individual in the short-form video.

In some embodiments, a region within a video frame is defined. As an example, the region can include an area directly above table 612. When changes in sequential images of video occur within this region, the changes can be used to trigger a motion detection event for an object. When the object for which motion is detected is a product, the motion detection event can trigger the definition, selection, rendering, and/or inserting of a new virtual background. Some embodiments utilize OpenCV for image processing. OpenCV is a computer vision library that supports functionality including facial recognition, object detection, tracking human motions, tracking objects, camera movements, and motion detection. Other techniques and packages may also be used instead of, or in addition to, OpenCV.

Figure 7B:
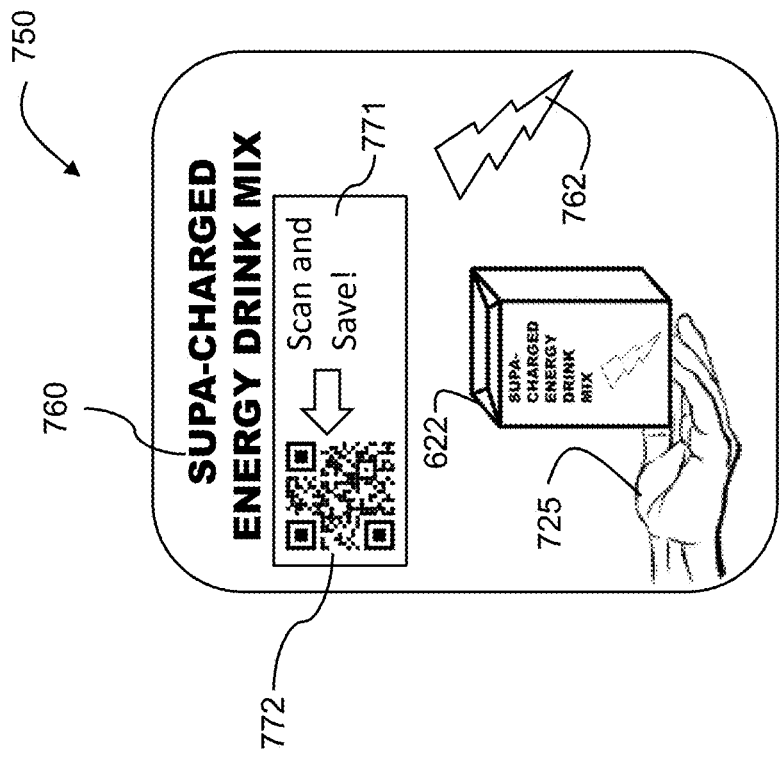
FIG. 7A and FIG. 7B show example virtual backgrounds.
Figure 7A:
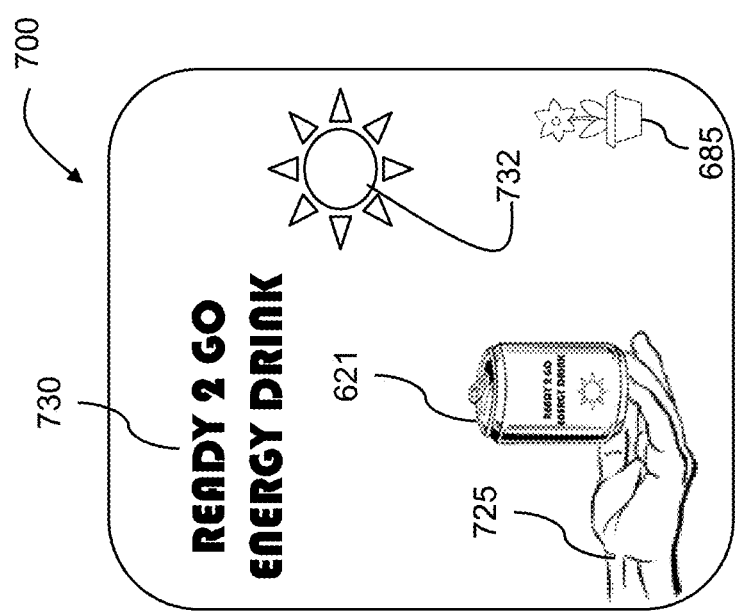

FIGS. 7A and 7B show example virtual backgrounds. Virtual backgrounds can enable manipulating video livestream background images. A short-form video is analyzed to identify foreground objects and background objects. One or more products are identified within the foreground objects within the short-form video. A virtual background based on the product within the foreground objects is defined. The foreground objects are rendered with the virtual background. A new video stream is created, based on the rendering of the foreground objects with the virtual background.

FIG. 7A shows an example of a virtual background 700 for product 621 of FIG. 6B. As the hand 725 of host individual 604 picks up the product 621, a corresponding virtual background 700 is rendered behind the product 621, as well as background object 685. The virtual background 700 includes a text element 730. The text element can include a name of a product, description of the product, advertising slogan, and/or other pertinent information. The virtual background 700 includes a graphical element 732. The graphical element can include a product logo, a company logo, an emoji, and/or another suitable image. In embodiments, when the host individual moves the product 621, a motion tracking process detects the motion of the product in the video and generates a system event. The system event causes the virtual background 700 corresponding to the product 621 to be defined, selected, rendered, and/or inserted into the video.

FIG. 7B shows an example of a virtual background 750 for product 622 of FIG. 6B. As the hand 725 of host individual 604 picks up the product 622, a corresponding virtual background 750 is rendered behind the product 622. In embodiments, the swapping is based on a change of subject matter. The virtual background 750 includes a text element 760. The text element can include a name of a product, description of the product, advertising slogan, and/or other pertinent information. The virtual background 750 includes a graphical element 762. The graphical element can include a product logo, a company logo, an emoji, and/or another suitable image. The virtual background 750 further includes a coupon 771. The coupon 771 includes a QR code 772. The coupon is part of the virtual background 750. The coupon enables product stakeholders to offer promotions utilizing the virtual background. A viewer can scan QR code 772 utilizing his/her smartphone or other suitable electronic computing device, in order to redeem coupon 771. Thus, in embodiments, the virtual background includes a coupon reference related to the product. In some embodiments, the coupon reference includes a quick response (QR) code. In this way, product demonstrations and/or promotions within livestreams, livestream replays, and/or other short-form videos are enhanced. As can be seen in FIG. 7B, the background object is not included (compare with 685 of FIG. 7A). In some embodiments, background objects are removed from the new, short-form video that utilizes a virtual background. In embodiments, when the host individual moves product 622, a motion tracking process detects the motion of the product in the video and generates a system event. The system event causes the virtual background 750 corresponding to the product 622 to be defined, selected, rendered, and/or inserted into the video.

As an example, product 621 can be a first product, and product 622 can be a second product. As the host individual moves product 621, viewers see a video that includes the background 700 as shown in FIG. 7A. When the host individual puts down product 621 and subsequently moves product 622, viewers see the background swapped to that shown at 750 in FIG. 7B. This swap of virtual backgrounds occurs automatically based on host individual actions. In embodiments, the swapping includes rendering the foreground objects with the second virtual background. In embodiments, the swapping occurs at a second insertion point and the second insertion point occurs when emphasis within the short-form video shifts from the first product to the second product.

Figure 8:
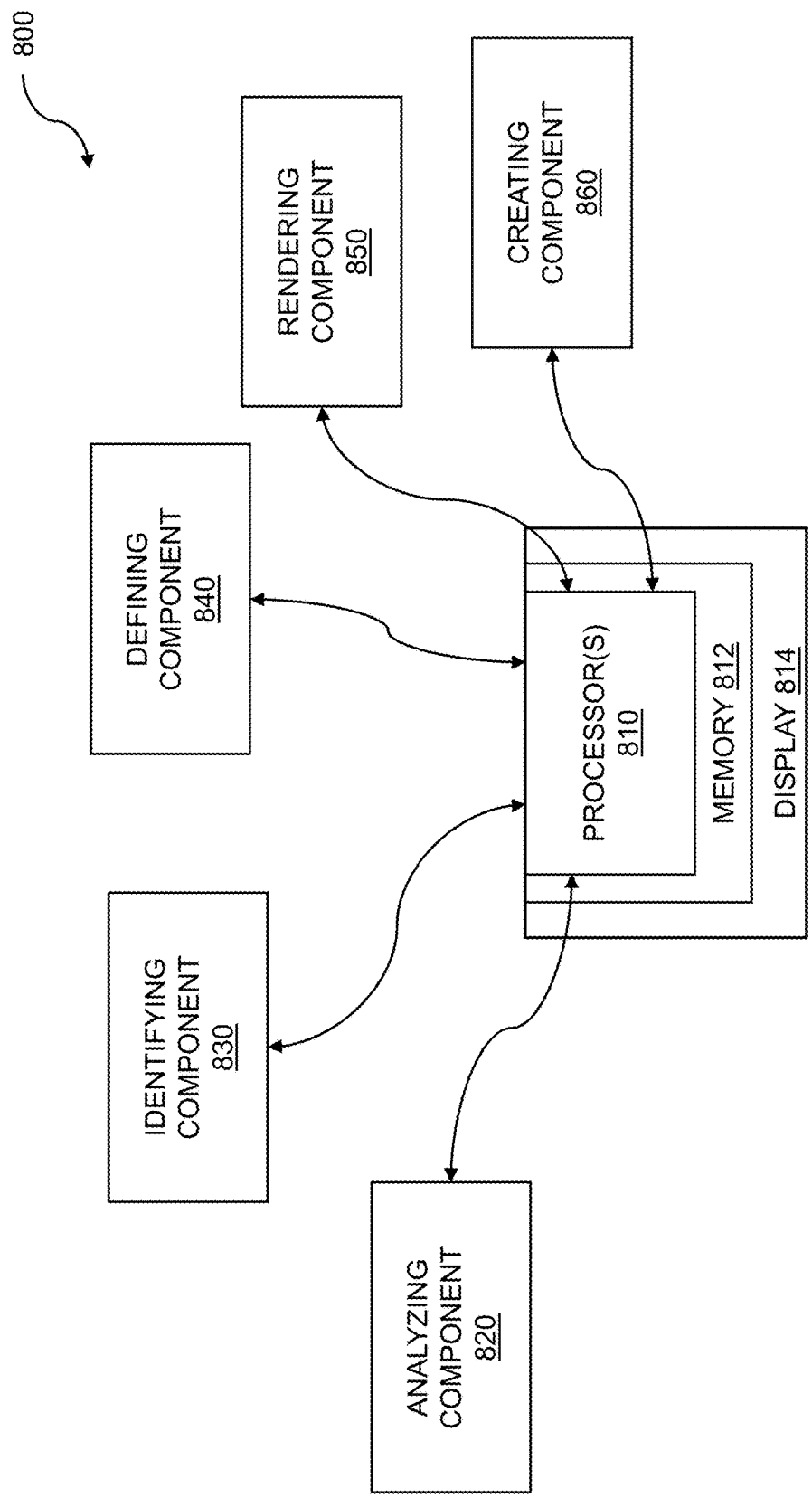
FIG. 8 is a system diagram for manipulating video livestream background images.

FIG. 8 is a system diagram for livestream virtual background manipulation. The virtual background can be defined, selected, and/or inserted based on context changes in the video. The context changes can include a change in subject of a video, a transition from discussion of a first product to discussion of a second product, movement of a product and/or object, gestures of a host individual, verbal utterances of a host individual, a time of day, and/or other criteria. The system diagram 800 can enable manipulating video livestream background images. A short-form video is analyzed to identify foreground objects and background objects. One or more products are identified within the foreground objects within the short-form video. A virtual background based on the product within the foreground objects is defined. The foreground objects are rendered with the virtual background. A new video stream is created, based on the rendering of the foreground objects with the virtual background.

The system 800 can include one or more processors 810 coupled to a memory 812 which stores instructions. The system 800 can include a display 814 coupled to the one or more processors 810 for displaying data; video streams; videos; video metadata; product information; creation, selection, and/or insertion of virtual backgrounds; virtual background sponsor information; virtual background auction/bid information; webpages; intermediate steps; instructions; and so on. In embodiments, one or more processors 810 are coupled to the memory 812 where the one or more processors, when executing the instructions which are stored, are configured to: analyze a short-form video to identify foreground objects and background objects; identify a product, using one or more processors, within the foreground objects within the short-form video; define a virtual background based on the product within the foreground objects; render the foreground objects with the virtual background; and create a new video stream based on the rendering of the foreground objects with the virtual background.

The system 800 can include an analyzing component 820. The analyzing component can analyze short-form videos; perform feature extraction, object identification, and determination of foreground object status and background object status for each object identified; identify host individuals; etc. The analyzing component 820 can utilize APIs for obtaining object information and/or host individual information.

The system 800 can include an identifying component 830. The identifying component 830 can include functions and instructions for identifying one or more products within a short-form video. The identifying component 830 can utilize machine learning systems to perform image classification. The identifying component can utilize barcodes imprinted on products and/or product packaging to determine a product type, product name, product category, vendor name, manufacturer name, product country of origin, and/or other relevant information regarding the product. The identifying component 830 can utilize APIs for obtaining product information.

The system 800 can include a defining component 840. The defining component 840 can include functions and instructions for defining a virtual background. The defining can be based on the product identified by the identifying component 830. The defining can include using a color scheme associated with a product and/or company. The defining can include text elements, graphical elements, company logos, product logos, and/or other information pertinent to the product. The defining can include text and/or graphical elements for product promotion, including coupons, QR codes, and/or other promotional elements. The defining component 840 can utilize APIs for obtaining virtual background information.

The system 800 can include a rendering component 850. The rendering component 850 can include functions and instructions for rendering foreground objects with the virtual background. The rendering can include chroma keying and compositing a virtual background by replacing each pixel of the background color with a corresponding pixel of the virtual background. In some embodiments, the rendering does not use chroma keying, but instead uses other techniques for background identification, enabling insertion of a virtual background without the need for a "green screen" background.

In embodiments, the defining the virtual background is based on machine learning. In some embodiments, a convolutional neural network (CNN) is utilized to identify foreground/subject pixels through deep learning, followed by performing a semantic segmentation process on faces and shoulders of people and foreground objects shown in the video frame and identifying the background pixels. This enables the rendering component 850 to determine with high certainty if a pixel in a given frame belongs to human and/or foreground objects, or the background. The background pixels can then be swapped with corresponding pixels from a virtual background. In embodiments, defining the virtual background comprises selecting a background from a plurality of background possibilities.

The system 800 can include a creating component 860. The creating component 860 can include functions and instructions for creating a new video stream based on the rendering of the foreground objects with the virtual background. The creating component can include encoding functions, as well as functions for encapsulation within a transport protocol, to enable broadcasting and/or multicasting of the new video within a content delivery network.

In some embodiments, the system 800 performs motion tracking of products within a video. Upon detection of motion of a product, a system event is generated. The system event can have metadata associated with it. The metadata can include, but is not limited to, a timestamp and a product identifier. The event is received by the defining component 840, which uses the product identifier to retrieve and/or generate a corresponding virtual background, which is rendered by the rendering component 850. The creating component receives the virtual background, along with the timestamp. The timestamp is used for determining when to insert the virtual background in a new, manipulated short-form video.

In some embodiments, the system 800 performs eye tracking of a host individual within a video. Upon detection of eye gaze of a host individual towards a product, a system event is generated. The system event can have metadata associated with it. The metadata can include, but is not limited to, a timestamp and a product identifier. The event is received by the defining component 840, which uses the product identifier to retrieve and/or generate a corresponding virtual background, which is rendered by the rendering component 850. The creating component receives the virtual background, along with the timestamp. The timestamp is used for determining when to insert the virtual background in a new, manipulated short-form video.

In some embodiments, the system 800 monitors camera parameters for a camera that is being used to create a video. Upon detection of zoom, focus, and/or panning towards a product, a system event is generated. The system event can have metadata associated with it. The metadata can include, but is not limited to, a timestamp and a product identifier. The event is received by the defining component 840, which uses the product identifier to retrieve and/or generate a corresponding virtual background, which is rendered by the rendering component 850. The creating component receives the virtual background, along with the timestamp. The timestamp is used for determining when to insert the virtual background in a new, manipulated short-form video.

In some embodiments, the system 800 monitors text conversations in a chat window that is associated with a livestream video. The system 800 can utilize natural-language processing (NLP) techniques to determine context and/or sentiment. Upon detecting a sentiment, a system event is generated. The system event can have metadata associated with it that includes sentiment. As an example, if the sentiment indicates that an item seems too expensive, the system event metadata can include that. In response to detecting that event, the defining component 840 can render a new virtual background that includes a coupon and/or promotional offer, to increase sales of a product.

As can now be appreciated, disclosed embodiments provide techniques for manipulating video livestream background images. A short-form video, such as a livestream video or livestream replay video, is analyzed for context. As context changes, a new virtual background is inserted in a video. The new virtual background is based on the context. The context can include a product. The virtual background can include coupons and/or promotional offers related to the product. A subject matter of a video is obtained via computer-implemented techniques, such as natural-language processing (NLP) and/or entity detection, and a virtual background is defined, selected, rendered, and/or inserted in response to the detected subject matter. The virtual background changes automatically as different products are discussed and/or showcased. The virtual backgrounds can be sponsored and/or auctioned to enable additional revenue for content creators. In embodiments, the short-form video comprises a livestream. In embodiments, the short-form video comprises a livestream replay. In some embodiments, the virtual backgrounds have an expiration date. In some embodiments, when a livestream replay is requested, an assessment is made to determine if any of the virtual backgrounds in the livestream replay have expired. This assessment can include querying metadata associated with the livestream replay. The metadata associated with the livestream replay can include expiration dates and insertion times of each virtual background. In embodiments, any virtual backgrounds that have expired are removed and/or swapped with new virtual backgrounds. In this way, livestream replays continue to convey current information. As an example, if a virtual background in a livestream replay included a coupon and/or offer has expired, that virtual background can be removed for the next time that livestream replay is broadcast. Optionally, a new virtual background with a new coupon/offer can be swapped into the livestream replay, such that whenever the livestream replay is viewed, out-of-date virtual backgrounds are removed, and new virtual backgrounds can be inserted at the point where the out-of-date virtual backgrounds were previously displayed.

The system 800 can include a computer program product embodied in a non-transitory computer readable medium for video manipulation, the computer program product comprising code which causes one or more processors to perform operations of: analyzing a short-form video to identify foreground objects and background objects; identifying a product, using one or more processors, within the foreground objects within the short-form video; defining a virtual background based on the product within the foreground objects; rendering the foreground objects with the virtual background; and creating a new video stream based on the rendering of the foreground objects with the virtual background.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general-purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM); an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States, then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A computer-implemented method for video manipulation comprising:
    analyzing a short-form video to identify foreground objects and background objects;
    identifying a product, using one or more processors, within the foreground objects within the short-form video;
    defining a virtual background based on the product within the foreground objects;
    rendering the foreground objects with the virtual background;
    identifying a second product within the foreground objects;
    swapping to a second virtual background based on the second product; and
    creating a new video stream based on the rendering of the foreground objects with the virtual background.

2. The method of claim 1 further comprising determining an insertion point for a new virtual background within the short-form video.

3. The method of claim 1 wherein the defining the virtual background comprises selecting a background from a plurality of background possibilities.

4. The method of claim 1 wherein the virtual background includes a coupon reference related to the product.

5. The method of claim 1 further comprising extracting a host individual in the short-form video and performing the defining the virtual background using information from the host individual.

6. The method of claim 1 wherein the swapping includes rendering the foreground objects with the second virtual background.

7. The method of claim 1 wherein the swapping occurs at a second insertion point and the second insertion point occurs when emphasis within the short-form video shifts from the product to the second product.

8. The method of claim 1 wherein the swapping is based on a time interval and/or a change of subject matter.

9. The method of claim 1 further comprising identifying a plurality of products within the foreground objects within the short-form video.

10. The method of claim 1 wherein defining the virtual background is based on metadata.

11. The method of claim 2 further comprising starting the rendering of the foreground objects with the virtual background at the insertion point.

12. The method of claim 3 wherein the selecting the background from a plurality of background possibilities is based on the analyzing the short-form video.

13. The method of claim 3 wherein the selecting the background from a plurality of background possibilities comprises auctioning a sponsored virtual background.

14. The method of claim 3 wherein the selecting the background from a plurality of background possibilities is based on an auction bid related to the product.

15. The method of claim 3 wherein the selecting the background from a plurality of background possibilities is based on a sponsorship of the short-form video.

16. The method of claim 13 wherein an auction bid is based on a length of time the sponsored virtual background is displayed.

17. The method of claim 5 wherein the defining the virtual background is based on actions and/or spoken words of the host individual.

18. The method of claim 9 further comprising selecting the product within the plurality of products.

19. The method of claim 18 wherein the selecting is based on information in an audio track associated with the short-form video and/or eye gaze of a host individual in the short-form video.

20. A computer program product embodied in a non-transitory computer readable medium for video manipulation, the computer program product comprising code which causes one or more processors to perform operations of:
analyzing a short-form video to identify foreground objects and background objects;
identifying a product, using one or more processors, within the foreground objects within the short-form video;
defining a virtual background based on the product within the foreground objects;
rendering the foreground objects with the virtual background;
identifying a second product within the foreground objects;
swapping to a second virtual background based on the second product; and
creating a new video stream based on the rendering of the foreground objects with the virtual background.

21. A computer system for video manipulation comprising:
a memory which stores instructions;
one or more processors coupled to the memory wherein the one or more processors, when executing the instructions which are stored, are configured to:
analyze a short-form video to identify foreground objects and background objects;
identify a product, using one or more processors, within the foreground objects within the short-form video;
define a virtual background based on the product within the foreground objects;
render the foreground objects with the virtual background;
identify a second product within the foreground objects;
swap to a second virtual background based on the second product; and
create a new video stream based on the rendering of the foreground objects with the virtual background.

* * * * *